Patented May 24, 1949

2,471,018

UNITED STATES PATENT OFFICE 2,471,018

PRODUCTION OF SALTS OF AMINO METHIONIC ACID

Michael Henry Miller Arnold and William Eric Perry, Norton-on-Tees, England, assignors to Imperial Chemical Industries Limited, a corporation of Great Britain No Drawing. Application July 24, 1946, Serial No. 685,910. In Great Britain November 7, 1941

6 Claims. (Cl. 260—513)

This invention relates to the production of the sodium and potassium salts of amino methionic acid.

It is already known to prepare mono-potassium amino methionate by treatment of a solution of potassium bisulphite with potassium cyanide, followed by warming to 40° C., cooling to room temperature and precipitating the mono-potassium salt by the addition of hydrochloric acid. The reaction can be expressed by the following equation:

$$KCN + 2KHSO_3 + 2H_2O \rightarrow$$
$$NH_2CH(SO_3H)(SO_3K) + 2KOH$$

The addition of hydrochloric acid neutralizes the caustic potash formed in the above reaction so that part of the initial potassium ions are lost in the production of potassium chloride. Similarly, when sodium compounds are substituted for the potassium compounds in the above described reaction, part of the initial sodium ions are lost in the sodium chloride produced.

Thus, when the initial materials contain potassium compounds, the residual liquor contains, as a by-product, valuable potassium as the chloride which, for its recovery and conversion to the bisulphite for the production of further quantities of mono-potassium amino methionate, requires expensive and time-consuming processes. Furthermore, in the above-described process, irrespective of whether potassium or sodium salts are used, hydrochloric acid is consumed in the production of undesired chlorides.

The present invention provides a simple process for the production of the sodium and potassium salts of amino methionic acid, by means of which, the above-mentioned disadvantages are avoided and the cations of the hydroxides formed in the first step of the reaction are made readily available for further use in the process.

According to the present invention there is provided a process for the production of the sodium and/or potassium salt or salts of amino methionic acid which comprises reacting the cyanide of sodium and/or of potassium and water with the bisulphite of sodium and/or of potassium, precipitating the sodium and/or the potassium salt or salts of amino methionic acid by the addition of sulphur dioxide, separating the precipitated sodium and/or potassium salt or salts of amino methionic acid and returning the residual liquor to the reaction step after adding to the said liquor, if required, further sulphur dioxide to provide bisulphite of sodium and/or of potassium in the said liquor.

The reactions which occur according to the process of the present invention may be expressed by the following equations, wherein X is sodium or potassium:

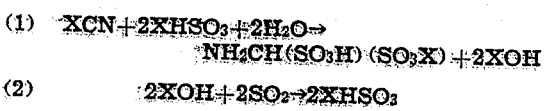
$$(1) \quad XCN + 2XHSO_3 + 2H_2O \rightarrow$$
$$NH_2CH(SO_3H)(SO_3X) + 2XOH$$
$$(2) \quad 2XOH + 2SO_2 \rightarrow 2XHSO_3$$

The caustic alkali produced is neutralized by the addition of sulphur dioxide, whereby the sodium and/or the potassium salt or salts of amino methionic acid is or are precipitated: after removal of the precipitated salt or salts of amino methionic acid, more sulphur dioxide is added to the liquor, if required, to provide the bisulphite of sodium and/or of potassium in the liquor which is then suitable for reaction with further quantities of the cyanide of sodium and/or of potassium and water for the production of more sodium and/or potassium salt or salts of amino methionic acid.

Broadly, therefore, the present invention provides a cyclic process for the production of the sodium and/or potassium salt or salts of amino methionic acid, in which after the initial cycle of operations is completed, the only additional reactants required are the cyanide of sodium and/or the cyanide of potassium, water and sulphur dioxide.

In the process of the present invention, we have found it preferable to add sulphur dioxide to the reactant liquor during both the reaction and precipitation steps, so that when the reaction and precipitation steps are complete the reactant liquor has a pH value of less than 7 before separation of the salt or salts of amino methionic acid. By this means discolouration of the liquor and of the products is avoided. We have found that if the pH value is brought to 3 or less, the mono-sodium and/or mono-potassium salt of amino methionic acid predominates in the product, while with pH values between 3 and 7, the di-sodium and/or the di-potassium salt of amino methionic acid predominates. The reaction is judged complete when the pH value of the reactant liquor, adjusted to within the hereinbefore defined ranges, as desired, shows no tendency to rise when the addition of sulphur dioxide is stopped.

Furthermore, we have found that increased yields of the di-sodium and/or the di-potassium salt can be obtained by the addition of the hydroxide or hydroxides of sodium and/or of potassium to the reactant liquor before or during the reaction and precipitation steps. The production of the di-sodium or the di-potassium salt may be represented by the following equation where X is sodium or potassium:

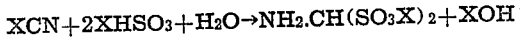
$$XCN + 2XHSO_3 + H_2O \rightarrow NH_2.CH(SO_3X)_2 + XOH$$

It will be seen that in the above equation only one molecule of hydroxide is produced compared with two molecules when the mono-salt or salts of amino methionic acid is or are being produced. Therefore, when a product containing a predominance of di-sodium and/or di-potassium amino methionate is being produced in a cyclic process according to the present invention, such an addition of hydroxide also assists in maintaining a satisfactory concentration of sodium and/or potassium ions in the reactant liquor, whereby the concentration of bisulphite in the liquor returned to the reaction step may be maintained at a value sufficient for satisfactory continuous operation.

The reaction may be carried out at elevated pressures, but satisfactory results are obtained at atmospheric pressure. While the reaction may be carried out at ordinary temperatures, it is preferable to use elevated temperatures up to the boiling point of the reactant liquor at the prevailing pressure. More preferably the reaction is carried out at temperatures between about 40° C. and 50° C.

When reaction is complete the precipitated salt or salts of amino methionic acid may be removed immediately, but if the reaction and precipitation steps have been carried out at elevated temperatures higher yields of solid material are obtained by cooling the reactant liquor to room temperature or below before undertaking such removal.

In the process of the present invention, dependent on the salt of amino methionic acid desired, the cation present in the initial cyanide and bisulphite may be either sodium or potassium. Mixtures of sodium and potassium salts of amino methionic acid may be produced according to the present invention by the use of reactants having different cations, for example, sodium cyanide may be used with potassium bisulphite, or mixtures of for example the cyanides of sodium and potassium may be used with sodium bisulphite and/or potassium bisulphite.

In the process of the present invention we have found it convenient, in the initial cycle of the process, to use as a source of sodium bisulphite and/or of potassium bisulphite a solution, in water, of the corresponding metabisulphite or metabisulphites.

Example 1

To a solution obtained by dissolving 380 grams of sodium metabisulphite in 750 mls. of water, were added 115 grams of sodium cyanide dissolved in 250 mls. of water. The solution was maintained at a temperature of about 45° C. on a water bath while sulphur dioxide was passed through it until the solution became permanently acid and had a pH value of 5, this being attained after 12 hours, when 100 grams of sulphur dioxide had been consumed. The solution was cooled to about 10° C., after which the precipitate was filtered off and dried. The dry precipitate weighed 280 grams and contained 80% of disodium amino methionate, $NH_2CH(SO_3Na)_2.5H_2O$.

Example 2

To a solution obtained by dissolving 380 grams of sodium metabisulphite in 750 mls. of water were added 115 grams of sodium cyanide dissolved in 250 mls. of water. The solution was maintained at a temperature of about 45° C. on a water bath while sulphur dioxide was passed through it until the solution became permanently acid and had a pH value of 3. After cooling the precipitate was separated, dried and weighed, giving a yield of mono-sodium amino methionate equivalent to 40% of the sodium cyanide consumed. A further 115 grams of sodium cyanide were added to the mother liquor and the operations repeated, whereby mono-sodium amino methionate was obtained equivalent to 80% of the second addition of sodium cyanide.

We claim:
1. A process for the production of alkali metal salts of amino methionic acid, which comprises reacting an alkali metal cyanide and water with the bisulphite of an alkali metal, acidifying the reaction mixture by the addition of sulphur dioxide, whereby the corresponding alkali metal salts of amino methionic acid are precipitated, separating the precipitated salt, and returning the residual liquor to the reaction stage.

2. A process for the production af alkali metal salts of amino methionic acid which comprises reacting an alkali metal cyanide and water with the bisulphite of an alkali metal, acidifying the reaction mixture by the addition of sulphur dioxide, whereby the corresponding alkali metal salts of amino methionic acid are precipitated, separating the precipitated salt, adding more sulphur dioxide to the residual liquor to provide therein further alkali metal bisulphite, and returning the liquor to the reaction stage.

3. A process for the production of alkali metal salts of amino methionic acid, which comprises reacting an alkali metal cyanide and water with the bisulphite of an alkali metal, acidifying the reaction mixture by the addition of sulphur dioxide to a pH of less than 3, whereby the corresponding alkali metal salts of amino methionic acid are precipitated, separating the precipitated salt, and returning the residual liquor to the reaction stage.

4. A process for the production of alkali metal salts of amino methionic acid, which comprises reacting an alkali metal cyanide and water with the bisulphite of an alkali metal, acidifying the reaction mixture by the addition of sulphur dioxide to a pH value of less than 3, whereby the corresponding alkali metal salts of amino methionic acid are precipitated, separating the precipitated salt, adding alkali metal hydroxide to the residual liquor to attain a pH value of between 3 and 7, and returning the residual liquor to the reaction stage.

5. A process for the production of alkali metal salts of amino methionic acid, which comprises reacting an alkali metal cyanide and water with the bisulphite of an alkali metal at a temperature within the range 40° to 50° C., acidifying the reaction mixture by the addition of sulphur dioxide, whereby the corresponding alkali metal salts of amino methionic acid are precipitated, separating the precipitated salt, and returning the residual liquor to the reaction stage.

6. A process for the production of alkali metal salts of amino methionic acid, which comprises reacting an alkali metal cyanide and water with the bisulphite of an alkali metal at a temperature within the range 40° to 50° C., cooling the reaction mixture to room temperature, acidifying the reaction mixture by the addition of sulphur dioxide, whereby the corresponding alkali metal salts of amino methionic acid are precipitated, separating the precipitated salt, and returning the residual liquor to the reaction stage.

MICHAEL HENRY MILLER ARNOLD.
WILLIAM ERIC PERRY.

REFERENCES CITED

The following references are of record in the file of this patent:

Etard, Comptes Rendus V. 88 (1879), p. 649–650.
Pechman et al., Ber. Deut. Chem. vol. 28, pp. 2374–2377, 1895.